(12) United States Patent
Lai (10) Patent No.: US 11,628,388 B2
(45) Date of Patent: Apr. 18, 2023

(54) FILTER HOUSING

(71) Applicant: PA.E Machinery Industrial Co., Ltd., Taichung (TW)

(72) Inventor: Ming-Yu Lai, Taichung (TW)

(73) Assignee: PA.E Machinery Industrial Co., Ltd., Taichung (TW)

( * ) Notice: Subject to any disclaimer, the term of this patent is extended or adjusted under 35 U.S.C. 154(b) by 27 days.

(21) Appl. No.: 17/348,872

(22) Filed: Jun. 16, 2021

(65) Prior Publication Data

US 2022/0274037 A1    Sep. 1, 2022

(30) Foreign Application Priority Data

Feb. 26, 2021   (TW) .................................. 110107102

(51) Int. Cl.
 *B01D 35/30*    (2006.01)
(52) U.S. Cl.
 CPC ........ *B01D 35/30* (2013.01); *B01D 2201/304* (2013.01); *B01D 2201/306* (2013.01); *B01D 2201/34* (2013.01)

(58) Field of Classification Search
 CPC .............. B01D 35/30; B01D 2201/304; B01D 2201/306; B01D 2201/34
 USPC ......................... 210/232, 450, 455, 440–444
 See application file for complete search history.

(56) References Cited

U.S. PATENT DOCUMENTS 4,743,374 A * 5/1988 Stifelman .............. B01D 27/08
210/DIG. 17

* cited by examiner

*Primary Examiner* — Madeline Gonzalez
(74) *Attorney, Agent, or Firm* — Burris Law, PLLC (57) ABSTRACT

A filter housing is adapted to be assembled with a cap and installed with an O-ring. The filter housing includes a surrounding wall that is formed with a retaining groove for installation of the O-ring therein, and that has a plurality of protrusions. The retaining groove is defined among inner and outer surrounding surfaces and a groove end surface. The protrusions protrude from one of the inner and outer surrounding surfaces toward the other. The one of the inner and outer surrounding surfaces is adapted to be separated from the O-ring when the surrounding wall is separated from the cap, and is adapted to contact the O-ring when the surrounding wall is assembled with the cap and when the O-ring is squeezed by the cap to deform.

4 Claims, 7 Drawing Sheets

FILTER HOUSING

CROSS-REFERENCE TO RELATED APPLICATION

This application claims priority of Taiwanese Patent Application No. 110107102, filed on Feb. 26, 2021.

FIELD

The disclosure relates to a water filtration device, more particularly to filter housing.

BACKGROUND

A typical water filter includes a cap, a filter housing coupled to the cap and defining a filtering space together with the cap, and a filter element installed in the filtering space. Generally, unfiltered water is introduced into the filtering space via the cap and filtered through the filter element, and then the filtered water is discharged via the cap. Therefore, the cap and the filter housing must be sealed to avoid leakage. It is common to provide an O-ring between the cap and filter housing to provide the seal required. Moreover, when assembling the cap with the filter housing, for convenience in assembling, the filter housing is sometimes assembled in an upside-down manner and which may cause the O-ring provided on the filter housing to fall. Therefore, the O-ring is conventionally inserted in a retaining groove provided on the filter housing in a tight-fitting manner to prevent it from falling. However, after extended use, due to the O-ring's excessive compression, this arrangement may cause the O-ring to be elastically fatigued and must be replaced.

SUMMARY

Therefore, the object of the disclosure is to provide a filter housing that is easy to assemble and can prolong the service life of the O-ring.

According to the disclosure, a filter housing is adapted to be assembled with a cap and installed with an O-ring. The filter housing includes a base wall and a surrounding wall. The surrounding wall extends from periphery of the base wall and cooperates with the base wall to define a water filtering space. The surrounding wall has an end wall portion that is distal from the base wall, a retaining groove that is formed in the end wall portion for installation of the O-ring therein, and a plurality of protrusions that are arranged within the retaining groove. The end wall portion has an inner surrounding surface that surrounds the water filtering space, an outer surrounding surface that surrounds and is opposite to the inner surrounding surface, and a groove end surface that is connected between the inner surrounding surface and the outer surrounding surface. The groove end surface cooperates with the inner and outer surrounding surfaces to define the retaining groove. The retaining groove has an opening that is opposite to the groove end surface. The protrusions protrude from one of the inner and outer surrounding surfaces toward the other one of the inner and outer surrounding surfaces such that the protrusions and the other one of the inner and outer surrounding surfaces are adapted to clamp the O-ring therebetween. The one of the inner and outer surrounding surfaces is adapted to be separated from the O-ring when the surrounding wall is separated from the cap. The one of the inner and outer surrounding surfaces adapted to contact the O-ring when the surrounding wall is assembled with the cap and when the O-ring is squeezed by the cap to deform.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
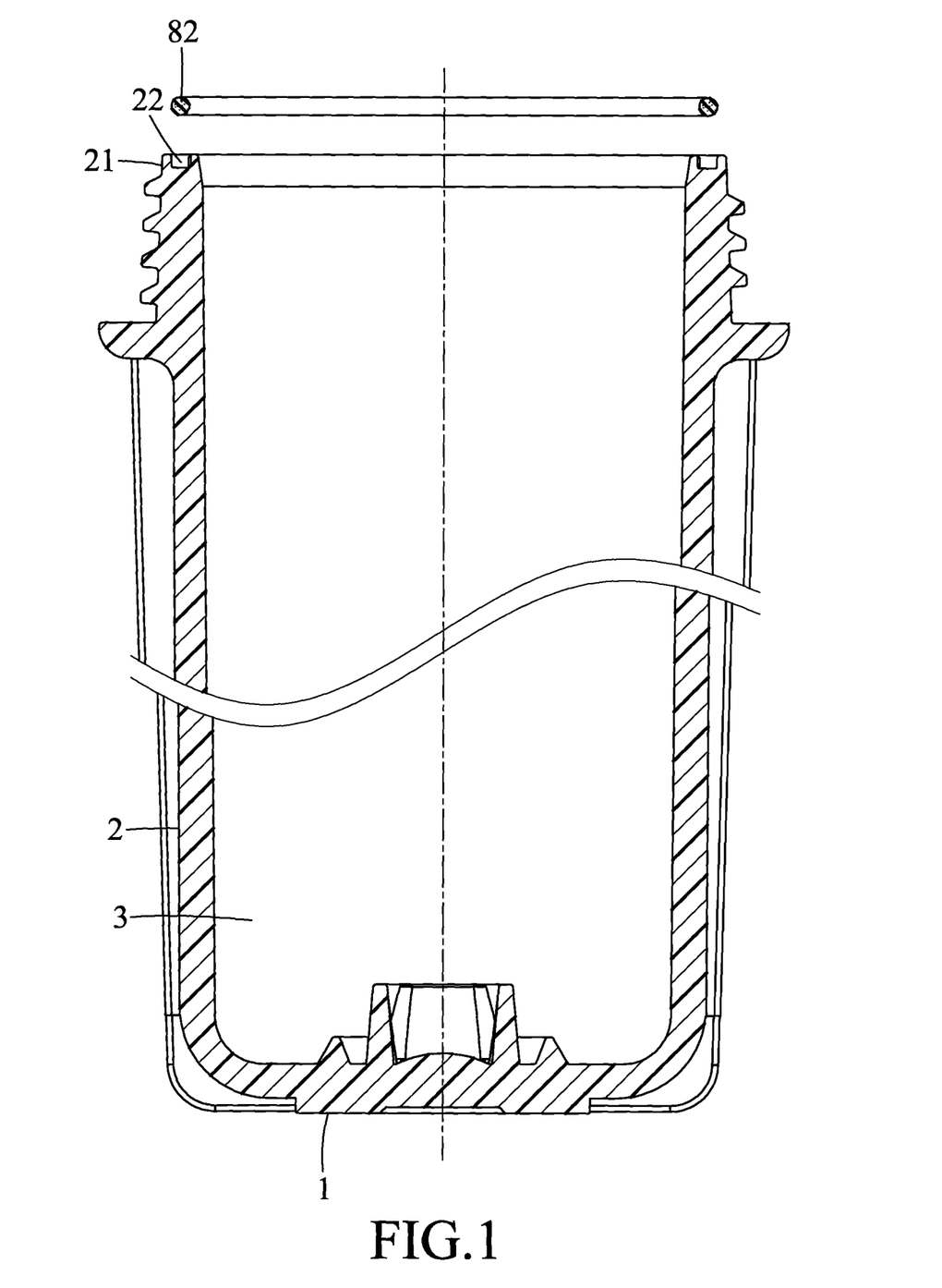
FIG. 1 is a fragmentary exploded cross-sectional view illustrating an O-ring and an embodiment of a filter housing according to the disclosure.
Figure 2:
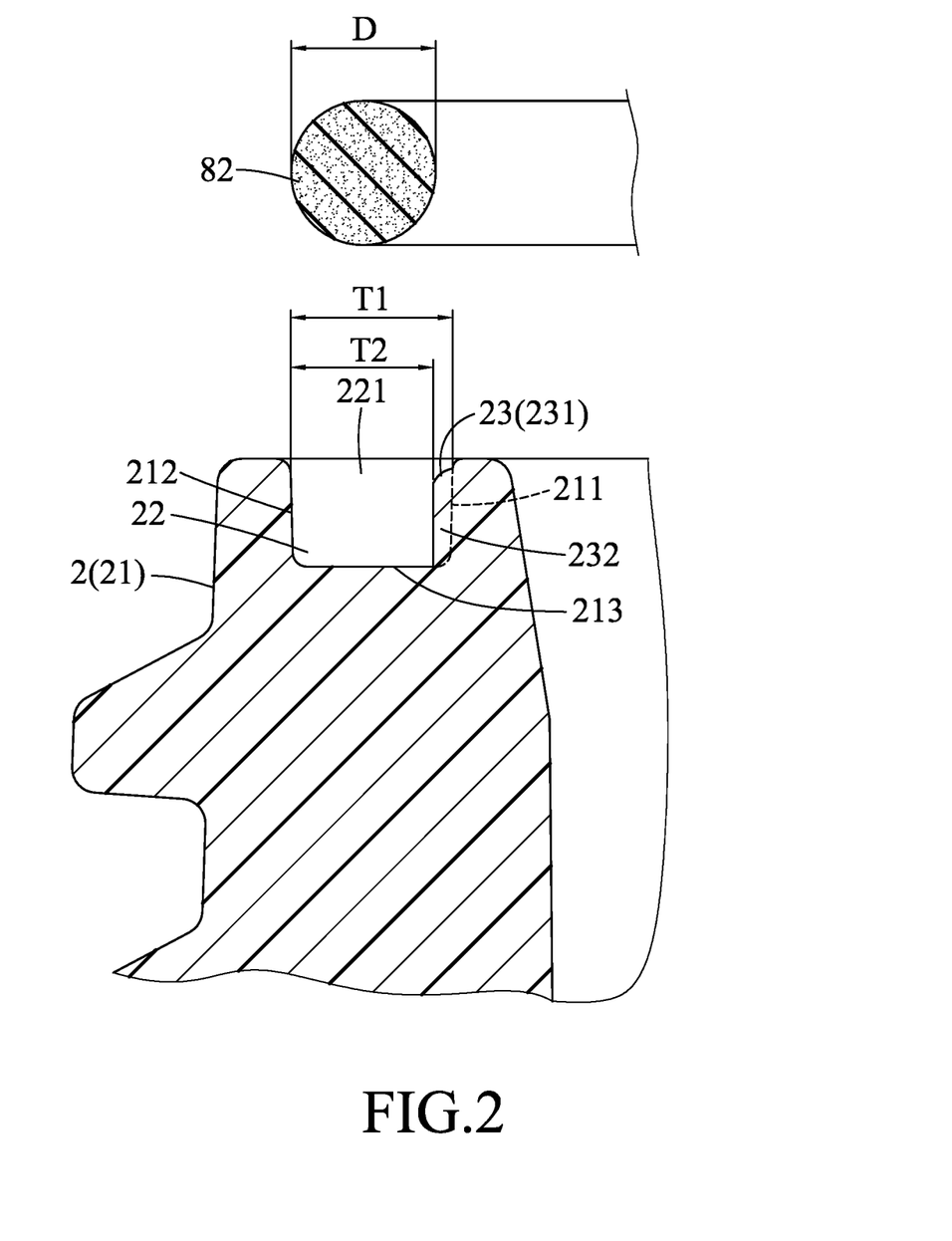
FIG. 2 is a fragmentary enlarged view of FIG. 1.
Figure 3:
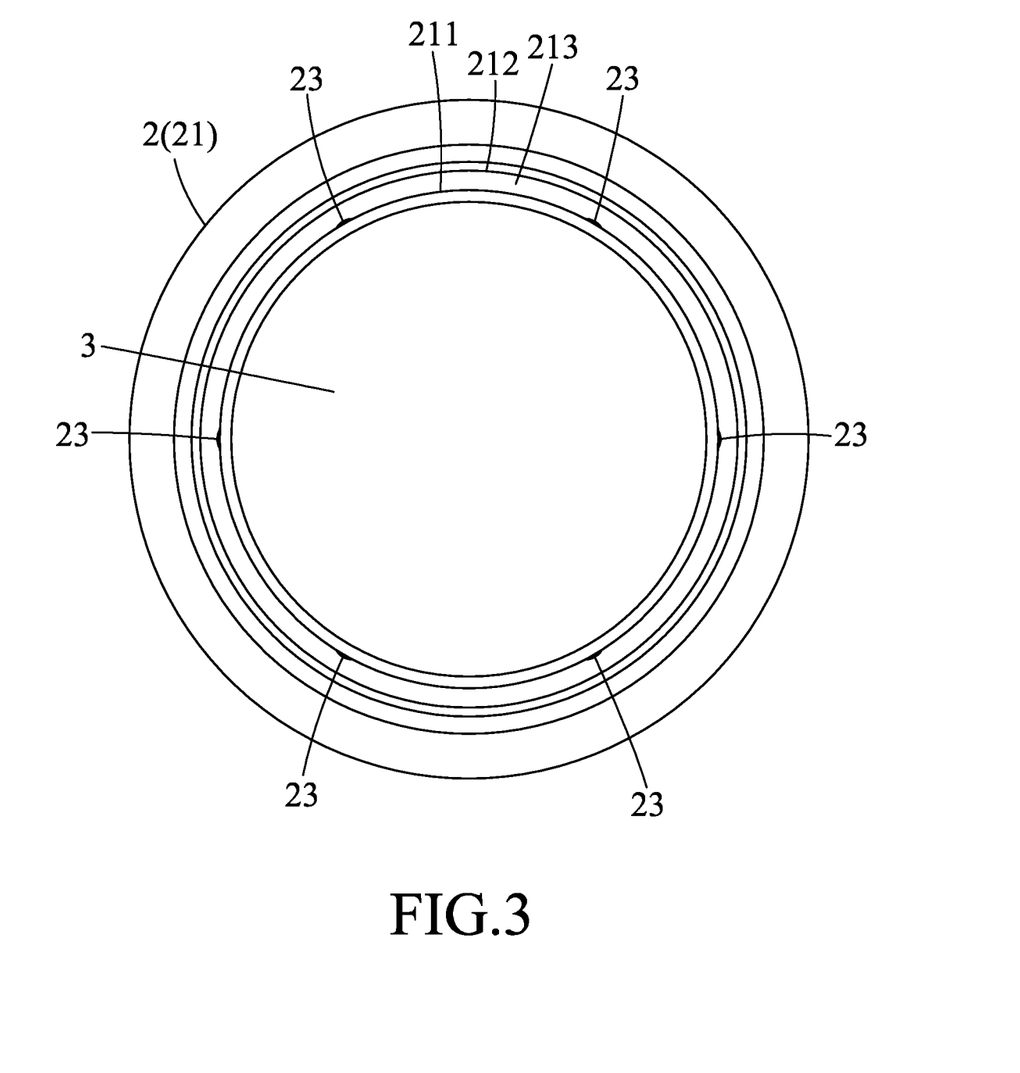
FIG. 3 is a top view of the embodiment.

As shown in FIGS. 1 to 3, the embodiment of a filter housing according to the present disclosure is adapted to be assembled to a cap 81 (see FIGS. 6 and 7) and installed with an O-ring 82. The filter housing includes a base wall 1, and a surrounding wall 2 extending from a periphery of the base wall 1 and cooperating with the base wall 1 to define a water filtering space 3.

The surrounding wall 2 has an end wall portion 21 distal from the base wall 1, a retaining groove 22 formed in the end wall portion 21 for installation of the O-ring 82 therein, and a plurality of protrusions 23 arranged within the retaining groove 22. The end wall portion 21 has an inner surrounding surface 211 that surrounds the water filtering space 3, an outer surrounding surface 212 that surrounds and is opposite to the inner surrounding surface 211, and a groove end surface 213 that is connected between the inner surrounding surface 211 and the outer surrounding surface 212, and that cooperates with the inner and outer surrounding surfaces 211, 212 to define the retaining groove 22. The retaining groove 22 has an opening 221 opposite to the groove end surface 213.

Each protrusion 23 protrudes horizontally from one of the inner and outer surrounding surfaces 211, 212 toward the other one of the inner and outer surrounding surfaces 211, 212, and has a guide portion 231 that is proximate to the opening 221 and a fixing portion 232 that interconnects the guide portion 231 to the groove end surface 213. The guide portion 231 has a horizontal thickness that gradually increases toward the fixing portion 232.

In this embodiment, the retaining groove 22 is circular, and the surrounding wall 2 has six of the protrusions 23 that are equi-angularly spaced apart and that protrude horizontally from the inner surrounding surface 211 toward the outer surrounding surface 212. However, in other variations, the retaining groove 22 may also be non-circular. In other embodiments, the protrusions 23 may also protrude from the outer surrounding surface 212 toward the inner surrounding surface 211. While the disclosure is exemplified using six protrusions 23 in this embodiment, two, three, four, five, or seven or more protrusions 23 may be employed in other embodiments.

The O-ring 82 is installed in the retaining groove 22 of surrounding wall 22 before the embodiment is assembled to the cap 81 for use.

Figure 4:
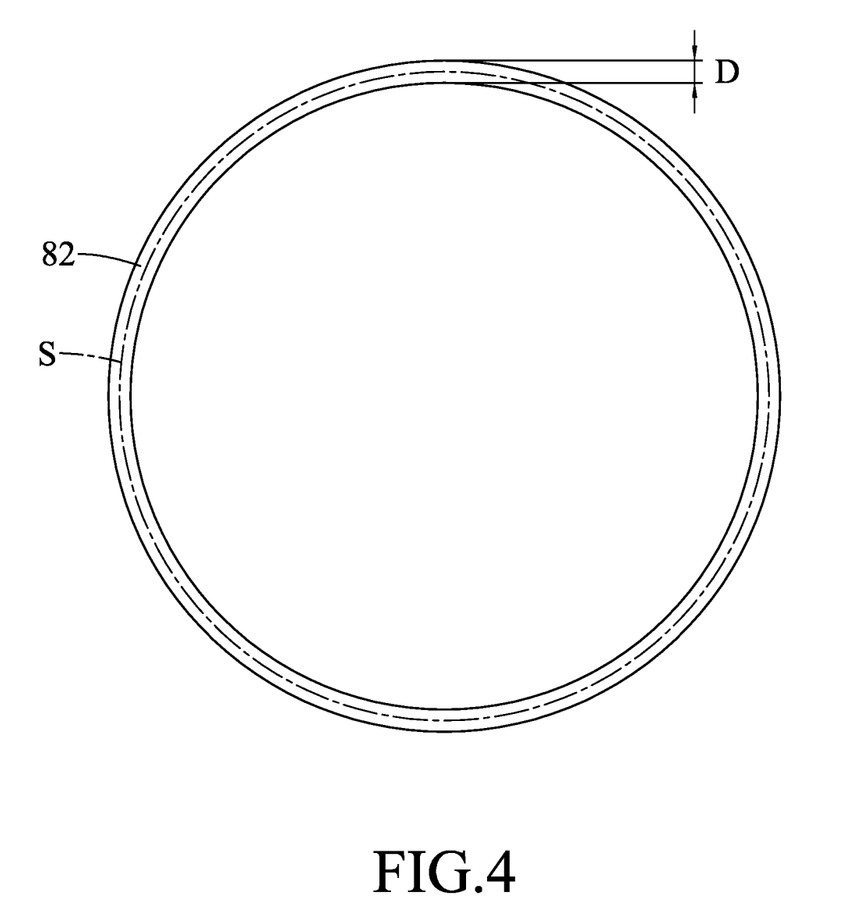
FIG. 4 is a top view of the O-ring.

As shown in FIGS. 2 and 4, before being installed in the retaining groove 22, the O-ring 82 extends along an imaginary circle (S). The O-ring 82 has a circular cross-section with a diameter (D) in the radial direction of the imaginary circle (S). A first distance (T1) between the inner and outer surrounding surfaces 211, 212 is slightly larger than the diameter (D) of the circular cross-section of the O-ring 82 before the embodiment is assembled to the cap 81 (i.e., when the surrounding wall 2 is separated from the cap 81). A second distance (T2) between the outer surrounding surface 212 and a joint between each protrusion 23 and the O-ring 82 is slightly smaller than the diameter (D) of the circular cross-section of the O-ring 82 before the embodiment is assembled to the cap 81.

Figure 5:
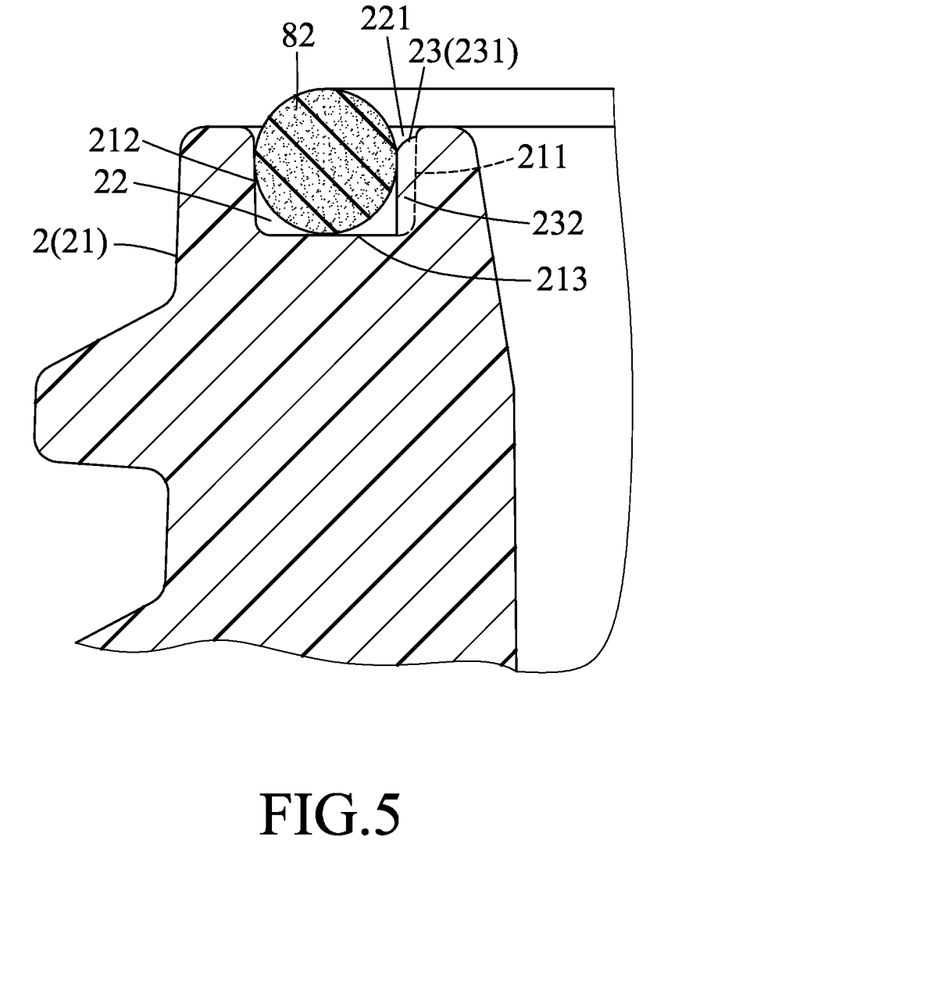
FIG. 5 is a view similar to FIG. 2 with the O-ring being installed in the embodiment.

Under the dimensional arrangement described in the preceding paragraph, while the present embodiment is not assembled with the cap 81, the O-ring 82 installed in the retaining groove 22, as shown in FIG. 5, is clamped by the protrusions 23 and the outer surrounding surface 212 of the end wall portion 21 of the surrounding wall 2 and is slightly deformed. At this time, the O-ring 82 only contacts the outer surrounding surface 212, and does not contact the inner surrounding surfaces 211 (i.e., the inner surrounding surface 211 is separated from the O-ring 82). However, the O-ring 82 would not easily fall off from the retaining groove 22 even if the present embodiment is to be assembled in an upside-down manner since the O-ring 82 will be held to the protrusions 23 and the outer surrounding surface 212 by frictional force.

Figure 6:
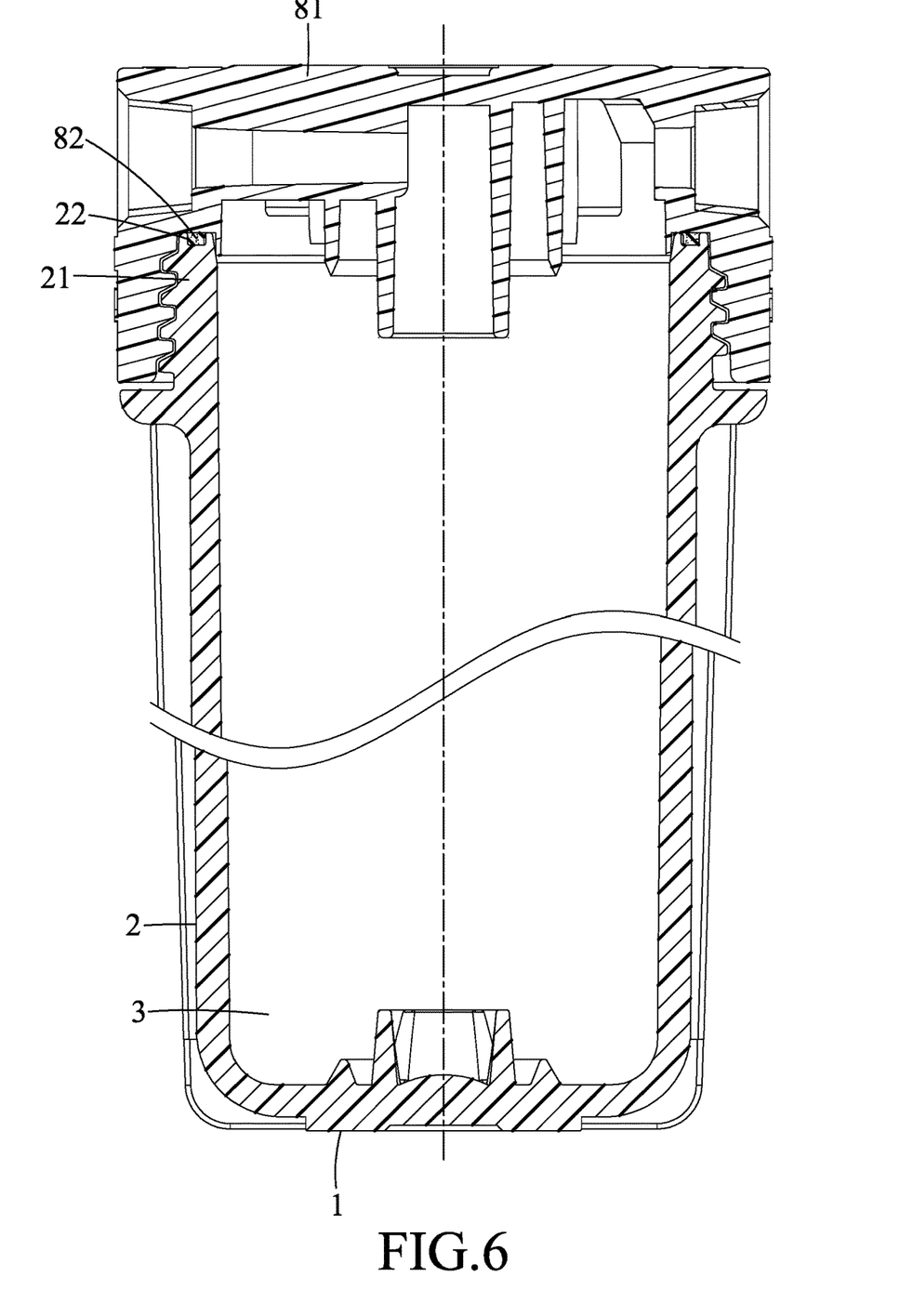
FIG. 6 is a fragmentary cross-sectional view illustrating the embodiment installed with the O-ring and assembled to a cap.
Figure 7:
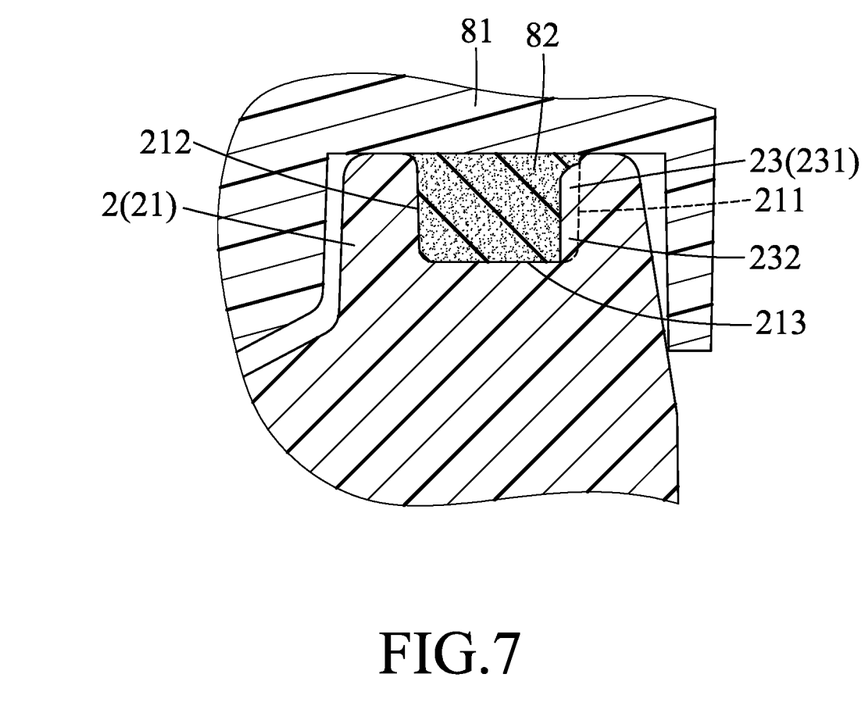
FIG. 7 is a fragmentary enlarged view of FIG. 6.

When the present embodiment is then assembled to the cap 81, the O-ring 82 is squeezed by the cap 81 to be deformed more, as shown in FIGS. 6 and 7, so it will fill up the spaces among the protrusions 23 and contact the inner surrounding surface 211 and the outer surrounding surface 212 at the same time, thereby preventing water leakage between the cap 81 and the end wall portion 21 of the surrounding wall 2.

It should be particularly noted that the O-ring 82 is squeezed to fill in among the protrusions 23 only when the present embodiment is assembled to the cap 81; therefore, the O-ring 82 will not be excessively compressed or deformed if the present embodiment were not assembled with the cap 81. Moreover, before the present embodiment is assembled to the cap 81, the spacing between the protrusions 23, that is, the gap between the O-ring 82 and the inner surrounding surface 211, is for containing deformed O-ring 82 when the O-ring 82 is squeezed by the cap 81. Therefore, the O-ring 82 will not be excessively compressed and elastically fatigued, and will have a prolonged service life.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cap various arrangements included within the spirit and scope of the broadest interpretation so as to encompass all such modifications and equivalent arrangements.

What is claimed is:

1. A filter housing adapted to be assembled with a cap and installed with an O-ring, said filter housing comprising:
   a base wall; and
   a surrounding wall extending from a periphery of said base wall and cooperating with said base wall to define a water filtering space, said surrounding wall having an end wall portion that is distal from said base wall, a retaining groove that is formed in said end wall portion for installation of the O-ring therein, and a plurality of protrusions that are arranged within said retaining groove, said end wall portion having
      an inner surrounding surface that surrounds said water filtering space,
      an outer surrounding surface that surrounds and is opposite to said inner surrounding surface, and
      a groove end surface that is connected between said inner surrounding surface and said outer surrounding surface, and that cooperates with said inner and outer surrounding surfaces to define said retaining groove, said retaining groove having an opening that is opposite to said groove end surface;
   wherein said protrusions protrude from one of said inner and outer surrounding surfaces toward the other one of said inner and outer surrounding surfaces such that said protrusions and said the other one of said inner and outer surrounding surfaces are adapted to clamp the O-ring therebetween;
   wherein each protrusion protrudes horizontally from said one of said inner and outer surrounding surfaces toward said the other one of said inner and outer surrounding surfaces, and has a guide portion that is proximate to said opening, and a fixing portion that interconnects said guide portion and said groove end surface, said guide portion of each protrusion having a horizontal thickness that gradually increases toward said fixing portion;
   wherein said one of said inner and outer surrounding surfaces is adapted to be separated from the O-ring when said surrounding wall is separated from the cap; and
   wherein said inner and outer surrounding surfaces are adapted to contact the O-ring at the same time when said surrounding wall is assembled with the cap and when the O-ring is squeezed by the cap to deform and to fill up spaces among said protrusions.

2. The filter housing as claimed in claim 1, wherein said protrusions protrude from said inner surrounding surface toward said outer surrounding surface, such that said inner surrounding surface is adapted to be separated from the O-ring when said surrounding wall is separated from the cap.

3. The filter housing as claimed in claim 1, wherein said retaining groove is circular and said protrusions are equi-angularly spaced apart.

4. The filter housing as claimed in claim 2, wherein:
- each protrusion protrudes horizontally from said inner surrounding surface toward said outer surrounding surface;
- a first distance between said inner and outer surrounding surfaces is slightly larger than a diameter of a circular cross-section of the O-ring when said surrounding wall is separated from the cap; and
- a second distance between said outer surrounding surface and a joint between each protrusion and the O-ring is slightly smaller than the diameter of the circular cross-section of the O-ring when said surrounding wall is separated from the cap.

\* \* \* \* \*